(12) United States Patent
Beale et al.

(10) Patent No.: US 11,525,529 B2
(45) Date of Patent: Dec. 13, 2022

(54) COMPOSITE TUBULAR STRUCTURE

(71) Applicant: Crompton Technology Group Limited, Solihull (GB)

(72) Inventors: Thomas Beale, Faringdon (GB); James Bernard, Brackley (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 1080 days.

(21) Appl. No.: 16/174,489

(22) Filed: Oct. 30, 2018

(65) Prior Publication Data
US 2019/0128449 A1 May 2, 2019

(30) Foreign Application Priority Data
Oct. 31, 2017 (EP) .................................... 17199427

(51) Int. Cl.
*F16L 15/08* (2006.01)
*F16B 7/18* (2006.01)
*F16C 7/02* (2006.01)

(52) U.S. Cl.
CPC .............. *F16L 15/08* (2013.01); *F16B 7/182* (2013.01); *F16C 7/026* (2013.01)

(58) Field of Classification Search
CPC .. F16C 3/02; F16C 3/023; F16C 3/026; F16C 7/02; F16C 7/026; F16C 2226/16;
(Continued)

(56) References Cited

U.S. PATENT DOCUMENTS 3,584,473 A * 6/1971 MacDonald .............. F16D 1/09
464/181
3,638,979 A * 2/1972 Francois ................... F16D 1/09
279/2.12
(Continued)

FOREIGN PATENT DOCUMENTS

DE 4135695 A1 * 4/1993 ........... B29C 53/587
DE 102011109130 A1 2/2013
(Continued)

OTHER PUBLICATIONS

Extended European Search Report for International Application No. 17199427.0 dated Apr. 9, 2018, 7 pages.

*Primary Examiner* — Amber R Anderson
*Assistant Examiner* — David M Griffin
(74) *Attorney, Agent, or Firm* — Cantor Colburn LLP

(57) ABSTRACT

A composite tubular structure includes an elongate composite member having an inwardly tapered section at an end and an embedded nut retained in the end inwardly tapered section for forming a connection with another component. The inwardly tapered section has an inner surface which follows a tapered outer surface of the embedded nut, the inwardly tapered section narrowing the composite member in a longitudinal direction towards the end so as to provide a constriction which retains the embedded nut within the inwardly tapered section. The embedded nut comprises a multipart nut, comprising an internal nut and an internal support member, and wherein the internal nut is arranged to slide within the internal support member in a direction away from the end of, and into, the elongate composite member when the composite tubular structure is under conditions of excessive axial compressive load.

15 Claims, 9 Drawing Sheets

(58) Field of Classification Search
CPC ........ F16C 2226/60; F16B 7/02; F16B 7/182; F16B 37/08; F16B 37/0807; Y10T 403/7067; Y10T 403/7069
USPC .......................................................... 403/296
See application file for complete search history.

(56) References Cited

U.S. PATENT DOCUMENTS

| | | | | |
|---|---|---|---|---|
| 3,721,134 | A | * | 3/1973 | Lamke .................. H01B 17/12 |
| | | | | 74/586 |
| 4,848,957 | A | | 7/1989 | Umeda |
| 5,320,579 | A | * | 6/1994 | Hoffmann ............... F16C 3/026 |
| | | | | 464/181 |
| 8,679,275 | B2 | * | 3/2014 | Schalla .................... F16C 7/02 |
| | | | | 156/169 |
| 9,050,759 | B2 | | 6/2015 | Boveroux et al. |
| 9,638,323 | B2 | | 5/2017 | Braun et al. |
| 2012/0125146 | A1 | | 5/2012 | Boveroux et al. |
| 2013/0324384 | A1 | * | 12/2013 | Keller .................... F16C 13/02 |
| | | | | 384/456 |
| 2014/0093302 | A1 | * | 4/2014 | Ingles .................... F16B 4/006 |
| | | | | 403/28 |
| 2016/0272304 | A1 | * | 9/2016 | Goldring ................ B64C 25/22 |
| 2017/0191520 | A1 | | 7/2017 | Larson |

FOREIGN PATENT DOCUMENTS

| | | |
|---|---|---|
| EP | 0313329 A2 | 4/1989 |
| GB | 2245954 A | 1/1992 |
| GB | 2546280 A | 7/2017 |
| WO | 2009066070 A1 | 5/2009 |

\* cited by examiner

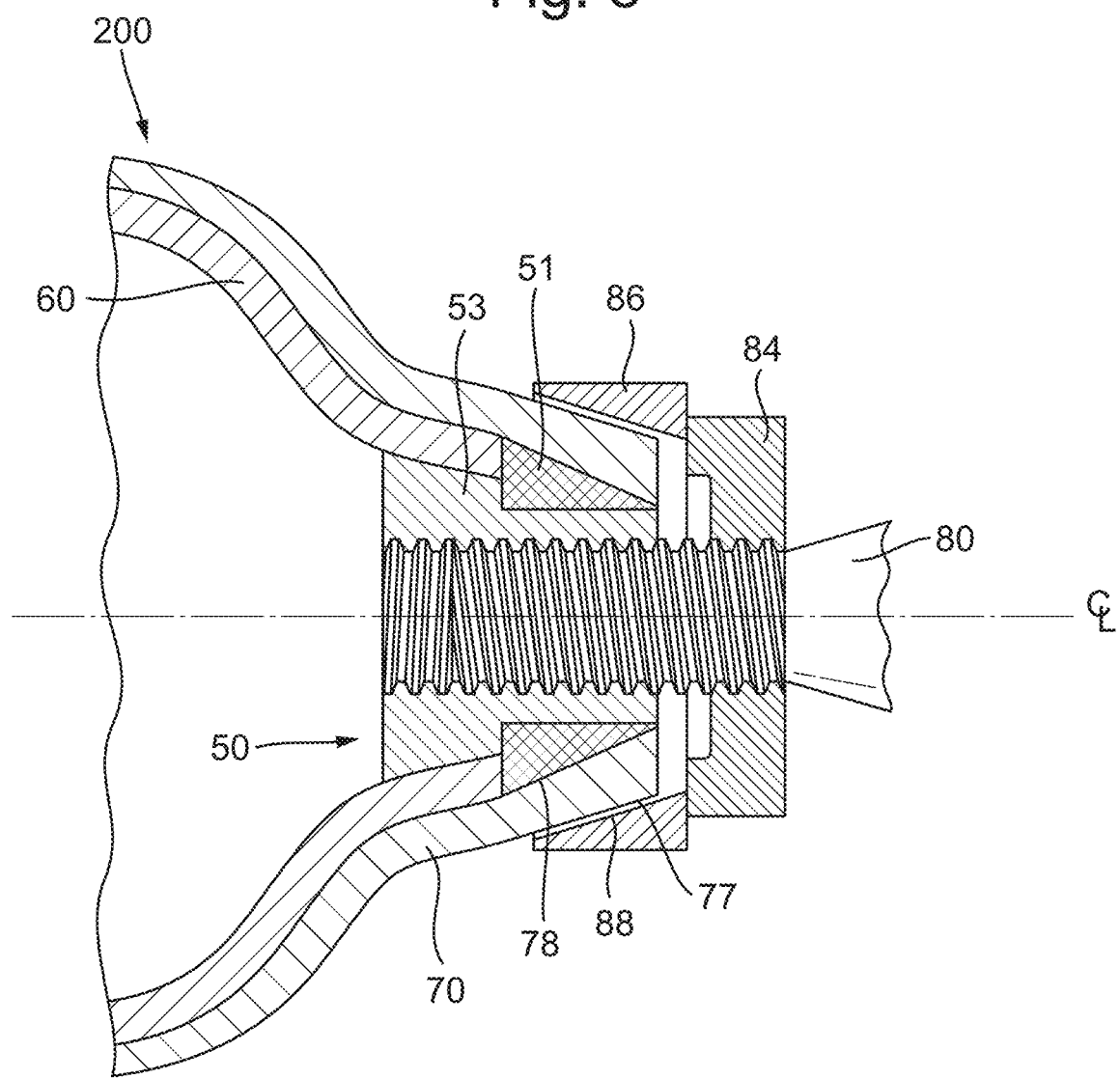

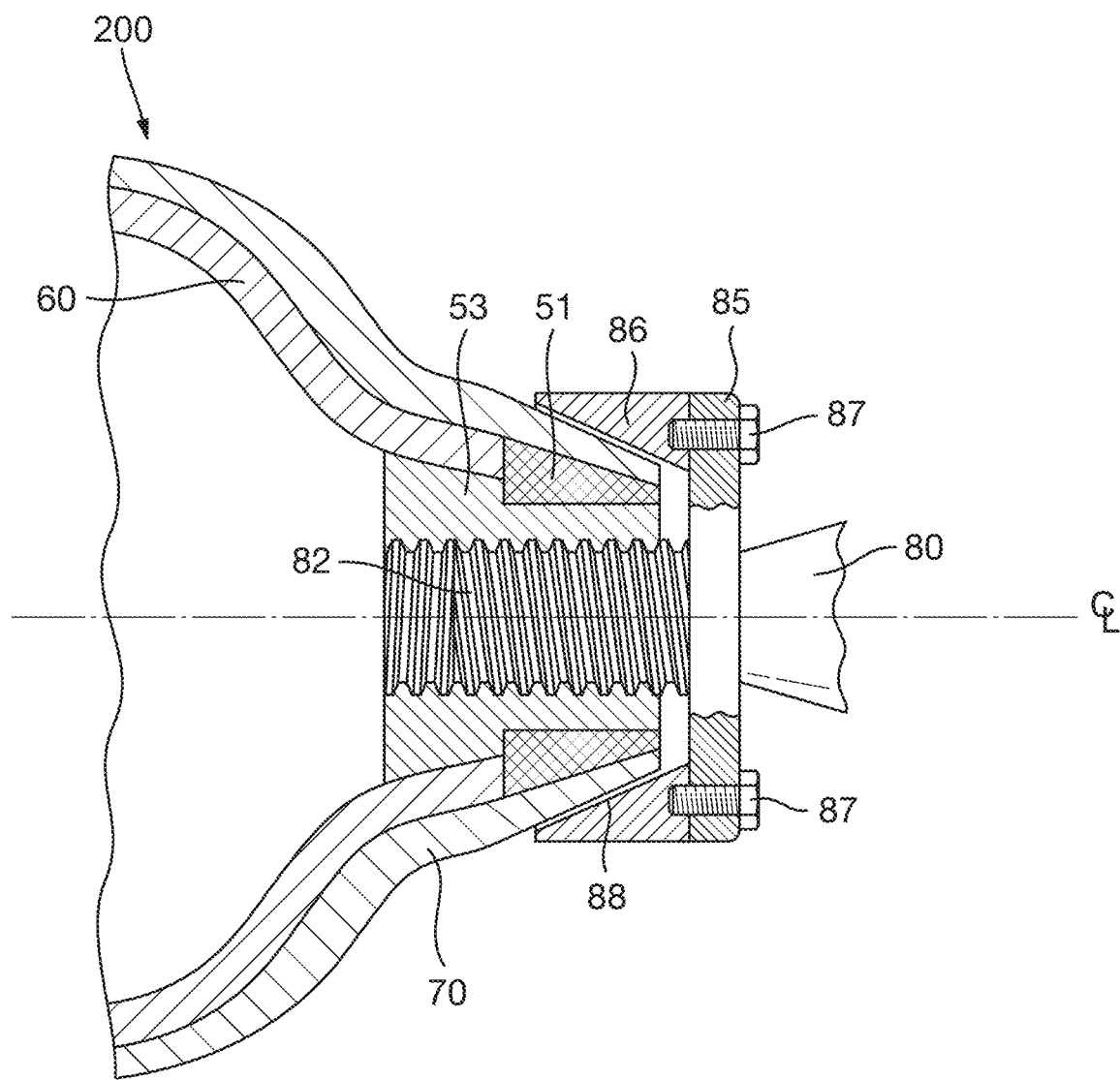

COMPOSITE TUBULAR STRUCTURE

FOREIGN PRIORITY

This application claims priority to European Patent Application No. 17199427.0 filed Oct. 31, 2017, the entire contents of which is incorporated herein by reference.

TECHNICAL FIELD

The disclosure relates to a composite tubular structure, in particular comprising a composite member with an embedded nut at each end for forming a connection to another component, and a method of manufacturing the composite tubular structure.

BACKGROUND

Composites offer the opportunity for light weight and cost effective solutions. The largest benefits are achieved when the load path and geometry are simple. Rods and struts, including both hydraulic and electric actuator rods are ideal candidates for composites and are extensively used on commercial aircraft. These parts generally require a complex form on the ends to interface with other components. Metals are weight and cost efficient for such complex geometries, and so therefore a connection between the composite and metallic elements is required. Joining in a robust, aerospace certifiable manner that maximises the benefits of the composite portions poses a significant industry challenge.

Various solutions are proposed in WO 2009/066070, EP-A-313329, U.S. Pat. No. 4,848,957 and US-A-2012/125146.

GB-A-2546280 discloses a composite tubular structure having a single-piece embedded nut, contained within a tapered portion of a composite tubular member, for engagement on a connecting rod projecting into the tapered portion, the structure further comprising an annular wedge provided with a tensioner, for clamping the tapered portion of the composite tubular member between the annular wedge and the embedded nut.

However, while composite joints are designed to transfer load within a certain operating range, for example ±20 kN, where "+" and "−" refer to tension and compression respectively, in fact loads may occasionally fluctuate significantly outside of this, for example, multiple times the intended range, e.g., to ±100 kN.

The arrangement of GB-A-2546280 provides good support of the tapered portion under tension, since the tapered portion of the composite tubular member is continuous in a circumferential direction and in direct contact with the tapered outer surface of the embedded nut. Greater tensile loads lead to larger hoop stresses which are countered by the annular wedge, which remains in contact with the composite tubular member even when the external nut has separated from the wedge under extreme tensile loads. However, under compression, the embedded nut may separate slightly from the tapered portion of the composite tubular member and as a result under extreme loading the tapered portion can fail at a compressive load which is less than the main body of the composite tubular member can withstand. The failure may be due to high compressive hoop stresses that the composite tubular member has to withstand alone, without support from the embedded nut (due to separation).

There is therefore a need to provide a connection for a composite tubular structure which is capable of providing reliable support to the composite tubular member under both extreme tensile and compressive loads.

SUMMARY OF THE DISCLOSURE

According to a first aspect of the disclosure, there is provided a composite tubular structure comprising an elongate composite member and an embedded nut. The elongate composite member has an inwardly tapered section at an end, within which the embedded nut is retained, for forming a connection with another component. The inwardly tapered section has an inner surface which follows a tapered outer surface of the embedded nut. The inwardly tapered section also narrows the composite member in a longitudinal direction towards the end so as to provide a constriction which retains the embedded nut within the inwardly tapered section. The embedded nut comprises a multipart nut, comprising an internal nut and an internal support member. The internal nut is arranged to slide within the internal support member in a direction away from the end of, and into, the elongate composite member when the composite tubular structure is under conditions of excessive axial compressive load.

By "excessive axial compressive load" used herein it is meant axial compressive loads which exceed the expected working loads by a reasonable margin (for example, twice, three times, four times, five times, seven times etc., the expected working load, the reasonable margin depending on the situation in hand). Such axial compressive loads may be close to or at the limits of the strength of the structure and might be labelled as "excessive" when they are within a prescribed percentage of an ultimate compressive load value for the structure, for example, more than 50%, 60%, 70%, 80%, 90%, 95%, etc., of an ultimate compressive load value of the structure depending on the situation and the requirements for loading and working safety margin.

In addition to or as an alternative to the foregoing, the internal nut may have a radially inner engagement surface for engaging with an end fitting or attachment and a radially outer first sliding surface; and the internal support member may have a radially outer surface providing the tapered outer surface of the embedded nut, and a radially inner second sliding surface for contacting and sliding on the first sliding surface of the internal nut.

In addition to or as an alternative to the foregoing, at least a portion of the first sliding surface of the internal nut and a portion of the second sliding surface of the internal support member may be parallel to a central axis of the internal nut.

In addition to or as an alternative to the foregoing, at least a portion of the first sliding surface of the internal nut and a portion of the second sliding surface of the internal support member may be at an inclined angle to a central axis of the internal nut, sloping radially towards the central axis in a direction towards the end of the elongate composite member, the angle being greater than 0°. The angle may be less than the angle of the tapered outer surface of the multipart nut.

In addition to or as an alternative to the foregoing, the composite tubular structure may include a connector to provide a connection with another component. The connector may comprise: an end fitting or attachment for engaging the internal nut of the multipart nut, the engagement occurring within the inwardly tapered section; an annular wedge configured to urge against an outer surface of the inwardly tapered section; and a tensioner provided to exert a clamping force on the inwardly tapered section via the annular wedge.

In addition to or as an alternative to the foregoing, the internal support member may be arranged to remain in place against the inner surface of the inwardly tapered section under the conditions of excessive axial compressive load to counter hoop stresses exerted by the annular wedge on the outer surface of the inwardly tapered section.

In addition to or as an alternative to the foregoing, the internal nut may comprise a radially protruding portion at one end which is configured to limit the sliding of the internal nut within the internal support member in a direction towards the end of the elongate composite member, to help transmission of axial loads under conditions of tensile loading.

In addition to or as an alternative to the foregoing, the inwardly tapered sections may each have a taper angle of between 5 to 25° to a central axis of the structure, optionally between 8 to 15°.

In addition to or as an alternative to the foregoing, the tubular structure may comprise a liner within the composite member, and the embedded nut may comprise a step in its outer surface for attachment of the liner, the step being provided by a radial difference between a radially outermost surface of the internal nut and a radially outermost surface of the internal support member, the liner resting in the step to define an outer radius which follows that of the nut to define an internal radius of the composite member in the longitudinal direction.

In addition to or as an alternative to the foregoing, the tubular structure may comprise an inwardly tapered section at both ends, each retaining an embedded multipart nut.

According to a second aspect of the disclosure, there is provided a method of manufacturing the tubular structure described in any of the statements above. The method comprises: attaching a nut to an end of a liner to provide a surface for depositing filaments over, the nut having a tapered outer surface and being arranged so that the outer surface tapers in a direction away from the liner; wherein the nut comprises a multipart nut, comprising an internal nut and an internal support member, in which the internal nut is able to slide within the internal support member in a direction away from its associated end of, and into, the elongate composite member; and depositing filaments around the liner and the attached nut to form a composite member having a main body portion and an inwardly tapered section at the end with the embedded nut, the inwardly tapered section having an inner surface which follows the tapered outer surface of the embedded nut.

In addition to or as an alternative to the foregoing, for the multipart nut: the internal nut may have a radially inner engagement surface for engaging with an end fitting or attachment and a radially outer first sliding surface; and the internal support member may have a radially outer surface comprising the tapered outer surface of the embedded nut, and a radially inner second sliding surface for contacting and sliding on the radially outer first sliding surface of the internal nut, wherein the method may include attaching the internal support member to the internal nut using a fastener at an end of the internal support member and internal nut distal from the liner. Optionally, the method may comprise a step of attaching a multipart nut to the other end of the liner.

In addition to or as an alternative to the foregoing, the liner may be supported between two parts of a mandrel while the filament deposition is taking place. Optionally, each part of the mandrel may further comprise: an inward radial step, such that a portion of the mandrel has a larger diameter and a portion of the mandrel has a smaller diameter; and wherein once the winding has been completed and the mandrel is to be removed, a cut may be made in a radially inward direction through the composite member and optionally the multipart nut at a position adjacent to the fastener, and the mandrel, any excess filament windings, the fastener and, optionally, any excised portions of the embedded nut may be removed.

In addition to or as an alternative to the foregoing, the method may comprise pressurising the liner during a winding and/or forming and/or curing operation, and/or in subsequent service of the tubular structure. Additionally or alternatively, the liner may be subsequently retained within the tubular structure, or the liner may be removed from within the tubular structure by melting, dissolving, burning, peeling, unravelling, fragmentation, UV degradation or another removal process.

According to a third aspect of the disclosure, there is provided a method of improving the compressive strength of a connection to a tubular structure described in one of the preceding statements in which the composite tubular structure includes a connector to provide a connection with another component. The method comprises using an embedded nut comprising an internal nut and an internal support member, the internal support member remaining in place against an inner surface of the inwardly tapered section to counter compressive hoop stresses applied through the annular wedge to the outer surface of the inwardly tapered section of the elongate composite member while permitting sliding of the internal nut within the internal support member in a direction away from the end of, and into, the elongate composite member under conditions of excessive compressive axial load.

BRIEF DESCRIPTION OF THE DRAWINGS

Various embodiments of the disclosure will now be described with reference to the following description and drawings by way of example only, and with reference to certain figures, wherein:

FIG. 8 shows a longitudinal cross-section of a composite tubular structure comprising a liner;

FIG. 9b shows a longitudinal cross-section of a composite tubular structure comprising a liner, illustrating an example of a formation that may be provided at an end of a retained liner, the structure having a taper of reducing wall thickness;

DETAILED DESCRIPTION

Figure 2A:
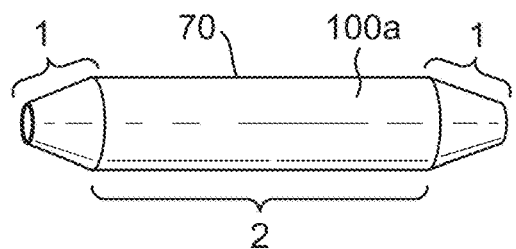
FIG. 2a shows schematically a composite tubular structure having a cylindrical main body portion with a constant radius.

As shown in FIG. 2a, an elongate composite member 70 may be configured so as to provide a main body portion 2 between two inwardly tapered sections 1. The elongate composite member 70 can be formed by filament winding. The filaments forming the inwardly tapered sections 1 may be continuous and helically-wound. Thus the wound filaments may form the truncated cone (frustoconical) shape of the inwardly tapered section 1.

The filaments may also be deposited by other production methods, for example, as part of a braiding process, or deposited through other filament placement processes, prepreg wrap processes or any other method of composite manufacture. The filaments may be deposited by a combination of any such deposition processes.

The inwardly tapered section 1 at each end of the composite member 70 can result in reduced weight due to the smaller diameter of (and hence reduced mass of) both ends, in particular the smaller diameters of any connecting elements, such as an embedded nut and an outer wedge of a connector which are described in more detail below.

The inwardly tapered sections 1 are continuous in the circumferential direction. Accordingly the composite member 70 can be made to have good axial load transmission properties in both tension and compression, in particular along the length of the inwardly tapered sections 1, because of their continuous structure.

The wall thickness of the composite member in the inwardly tapered sections 1 (the wall thickness of the filament windings and resin matrix) may be the same as or greater than in the main body portion. In this way there is a significant concentration of filaments, e.g., in the form of filament windings, able to transmit the axial loads (and where necessary torque) in the tapered sections through to a connector as compared to the main body portion. The wall thickness of the inwardly tapered sections 1 may be greater at the open, narrower end than at the end of the inwardly tapered sections adjacent the main body portion of the composite member 70.

A composite tubular structure 200 comprising the elongate composite member 70 may provide a rod or a strut. It may be for an aircraft. For example, it may have application as a hydraulic actuator, a centre wing box strut, part of a landing gear, etc. However it could also have applications in automotive and marine technical areas. The composite tubular structure 200 may be for transmitting significant axial forces, e.g., tensile or compressive loads, and may have to resist snapping or buckling. It may also have to transmit angular (i.e. non-axial) forces and be able to resist bending forces created through side loads resulting in axial tensile and compressive loads. It will typically include a rod end or a clevis for connection to another component.

Figure 7:
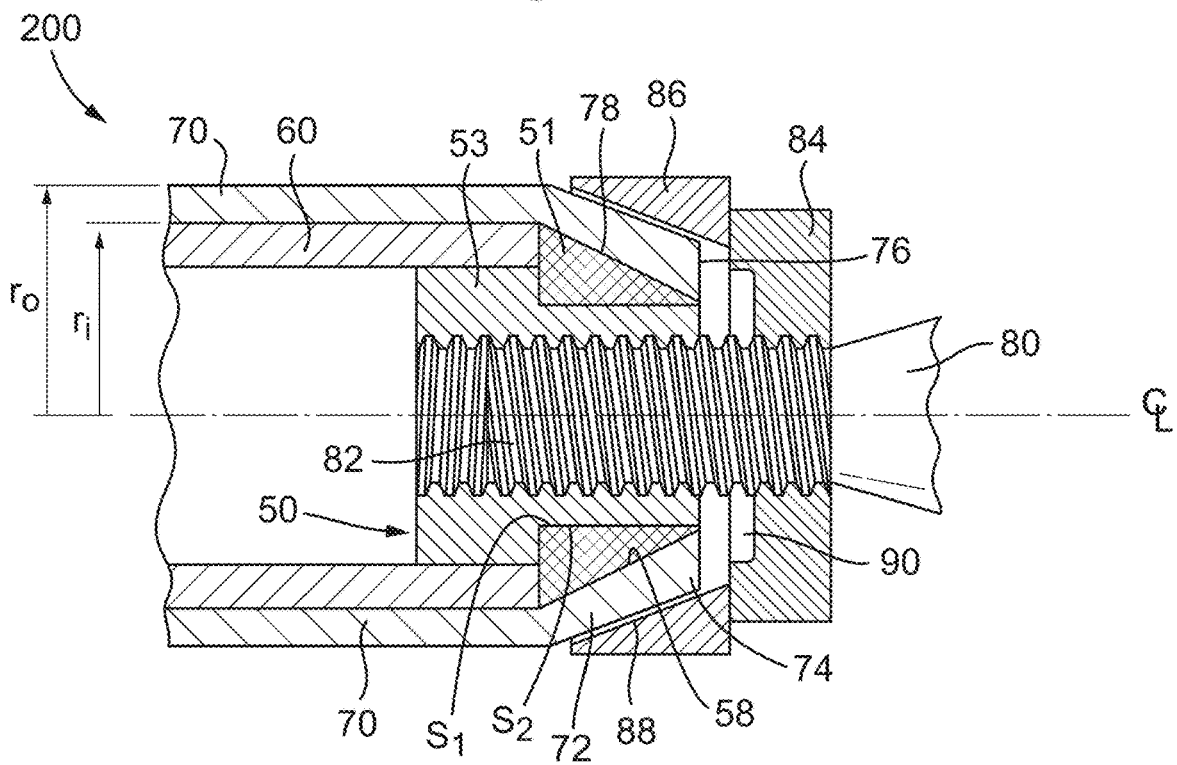
FIG. 7 shows a longitudinal cross section of one end of a composite tubular structure comprising a liner and an embedded multipart nut when connected to a connecting end fitting or attachment.

As shown in FIGS. 7 through to 11d, the composite tubular structure can be used with a connector 80, 84, 86 to connect it to parts of the aircraft or other vehicle (the connector 80, 84, 86 is only partially shown in these figures). The connector 80 may comprise an end fitting or attachment 80, which may for example be in the form of a rod or clevis, for engaging an embedded nut positioned within the inwardly tapered section 72 of the composite member 70, an annular wedge 86 configured to urge against an outer surface of the inwardly tapered section 72, and a tensioner 84, 85, 87 provided to exert a clamping force on the inwardly tapered section 72 via the annular wedge 86. Such an arrangement, with a single-piece embedded nut, is described in GB-A-2546280, which is incorporated herein by reference.

As described briefly above, the inwardly tapered section 72 at the end of the composite member 40 of the structure 200 allows an external nut 84 or annular wedge 86 to be placed over its outer surface. This can be tightened with a preload until a snug fit is achieved to allow a good transmission of loads. The annular wedge 86 is able to resist hoop stresses generated by the tensile forces on the embedded nut 50. If the annular wedge 86 is made strong enough, then a limit of the tensile strength of the composite member 70 of the composite tubular structure 200 may become the axial failure strength of the composite member 70 under tensile load.

However, under compression, in an arrangement with a single-piece nut like that of GB-A-2546280, it has been found that under compression, the embedded nut can sometimes pull away from the inner surface 78 of the inwardly tapered section 72, leading to failure of the composite member 70. This may occur when excessive compressive axial loads, e.g., compressive loads which exceed the expected working loads and are close to or at the limits of the strength of the structure, are experienced by the structure 200 at the connection between the connector 80 and the unsupported tapered section 72 of the composite member 70.

In the present disclosure, the above-described single-piece embedded nut positioned within the inwardly tapered section 72 of the composite member 70 is replaced with a multipart nut 50. The multipart nut 50 comprises at least an internal nut 53 and an internal support member 51, as will be described further below.

The benefit of this arrangement is that the strength of the connection, and hence of the component as a whole, when under conditions of excessive compressive axial loads, can be improved or made more reliable.

The split nature of the multipart nut 50, under such conditions, allows the internal nut 53 to be preferentially displaced by the connector 80 away from the end of, and into, the elongate composite member 70 as the tapered end (inwardly tapered section 72 of the composite member 70) begins to distort under load, leaving the internal support member 51 in place to support the inwardly tapered section 72. A tapered outer surface 58 of the internal support member 51 can then maintain contact with the inner surface 78 of the inwardly tapered section 72 and is able to continue to resist the hoop stresses exerted by the annular wedge 86 arising from the annular wedge 86 being pressed against the outer surface 77 of the inwardly tapered section 72 with increasing force.

As a result, with this additional support inside the inwardly tapered section 72, it is possible to avoid or reduce the tendency for failure to occur in the inwardly tapered section 72. This can raise the overall compressive strength, i.e. strength to resist failure of the inwardly tapered section 72 under compression to a point where it is the same as, or greater than, the axial failure strength of the main body of the composite member 70, thereby maximising the compressive strength of the assembly. Thus the ability of the internal nut 53 to slide relative to the internal support member 51 of the multipart nut 50, for example, through the first and second sliding surfaces $s_1$, $s_2$ being allowed to slide past one another, enables the internal support member 51 to continue to support the inwardly tapered section 72 of the composite member 70 when the internal nut 53 is translated into the elongate composite member under conditions of excessive compressive axial load, potentially avoiding or reducing the tendency for failure of the inwardly tapered section 72 of the composite member 70, and leading to higher compressive strengths of the composite tubular structure 200.

The internal nut 53 and the internal support member 51 of the embedded nut 50 may be formed of metal. For example, these parts could be of a high strength stainless steel or lightweight alloy, e.g., based on titanium or aluminium.

The composite tubular structure 200 may comprise a multipart nut 50 at both ends of the elongate composite member 70. In this way, both ends of the tubular structure benefit from this mechanism.

The internal nut 53 has a radially outer first sliding surface $s_1$ and the internal support member 51 has a radially inner second sliding surface $s_2$ for contacting and sliding on the radially outer first sliding surface of the internal nut 53.

The sliding surfaces $s_1$, $s_2$ may be parallel to the centreline CL, as shown in FIG. 7, for example. The sliding surfaces $s_1$, $s_2$, for example, may be concentric cylindrical surfaces. Alternatively, the sliding surfaces $s_1$, $s_2$ may diverge from the centreline CL, for example, they may be at an angle to the centreline CL, as shown in FIGS. 11a-11d, where the angle is greater than 0°, i.e. frustoconical surfaces.

Also as shown in FIGS. 11a-11d, the angle of the sliding surfaces to the centreline may be shallower than the taper angle of the composite member 70. This arrangement favours sliding at the sliding surfaces $s_1$, $s_2$ over sliding between the internal support member 51 and the inner tapered surface 78 of the inwardly tapered section 72 of the composite member 70.

The shallower the angle of the first and second sliding surfaces $s_1$, $s_2$ of the internal nut 53 and internal support member 51 compared to the tapered outer surface 58, the greater the relative frictional loading will be on the internal support member 51 holding it in place and allowing the relative movement of the internal nut 53.

The internal nut 53 may comprise a radially protruding portion or stop 56, for example, which might be in the form of a flange or collar, at one end of the internal nut 53 (which is furthest from the end of the elongate composite member 70 in which the internal nut 53 is disposed). This radially protruding portion or stop 56 may be configured to limit the sliding of the internal nut 53 within the internal support member 51 in a direction towards the end of the composite member 70 and help transmit axial loads when under tensile loading through the radially protruding portion or stop 56 of the internal nut abutting an end of the internal support member 51.

The radially protruding stop 56 also allows the internal nut 53 to prevent the internal support member 51 sliding past the end of the internal nut 53 and becoming lost within the elongate composite member 70 prior to the preloading by the end fitting.

If desired, the internal support member 51 may be bonded or otherwise adhered to the inner surface 78 of the inwardly tapered section 72 of the elongate composite member 70.

Alternatively, the internal support member may be held in place against the inner surface 78 of the inwardly tapered section 72 of the elongate composite member 70 through frictional forces when under preload.

Figure 4:
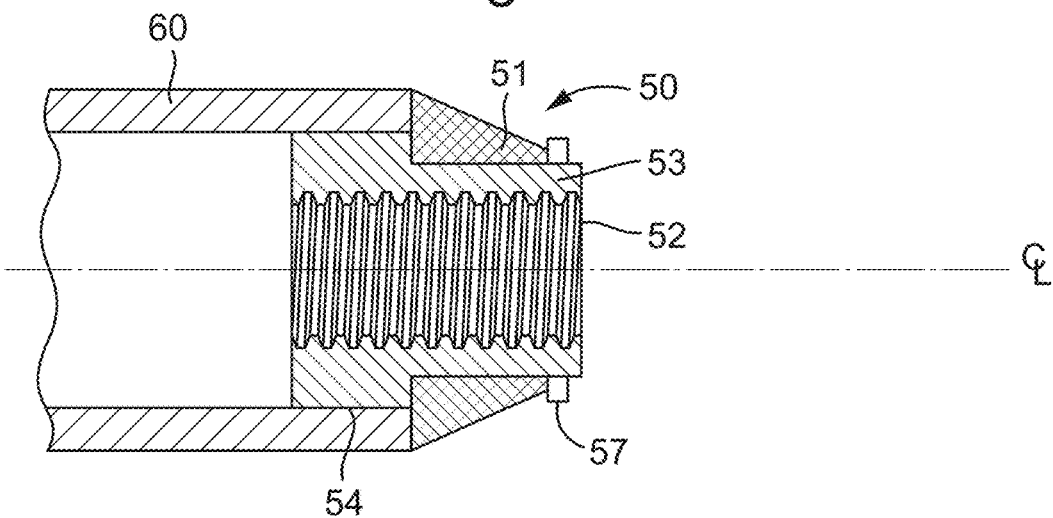
FIG. 4 is a longitudinal cross section showing a liner, an embedded multipart nut and a circlip.

A process for assembling the tubular structure will now be described. FIG. 4 depicts a close-up longitudinal cross section of an end of a workpiece with the mandrel 40 omitted, showing a liner 60 and a nut 50 which is to be embedded having an internal screw thread 52, disposed about a centre line CL. The nut 50 is a multipart nut, comprising an internal support member 51 at least partially surrounding an internal nut 53. The internal support member 51 and the internal nut 53 are held together by a fastener, such as a circular clip or circlip 57. The internal support member 51 has a tapered outer surface 58, configured to support an inwardly tapered section 72 of composite member 70.

In the embodiment, the internal nut 53 has a smaller outer diameter than the adjacent portion of the internal support member 51. This creates a step 54, to receive an end of the liner 60. The step 54 and the internal diameter of the liner 60 may be sized to provide a friction fit. Additionally or alternatively, an adhesive or sealant may be applied to join the respective surfaces. The liner 60 may comprise axial protrusions and/or recesses (not shown) to interlock with corresponding axial recesses and/or protrusions in the internal nut 53. Such interlocking features can help prevent relative rotation of the liner 60 and nut 50.

The nut 50, in place of the internal screw thread 52 may comprise an alternative female structure for securing an end fitting or attachment, which may for example be in the form of a rod 80, to the nut, for example a bayonet or other profiled structure that an end fitting or attachment such as a rod 80 can pull against to clamp the inwardly tapered section 72 of the composite member 70.

Figure 5:
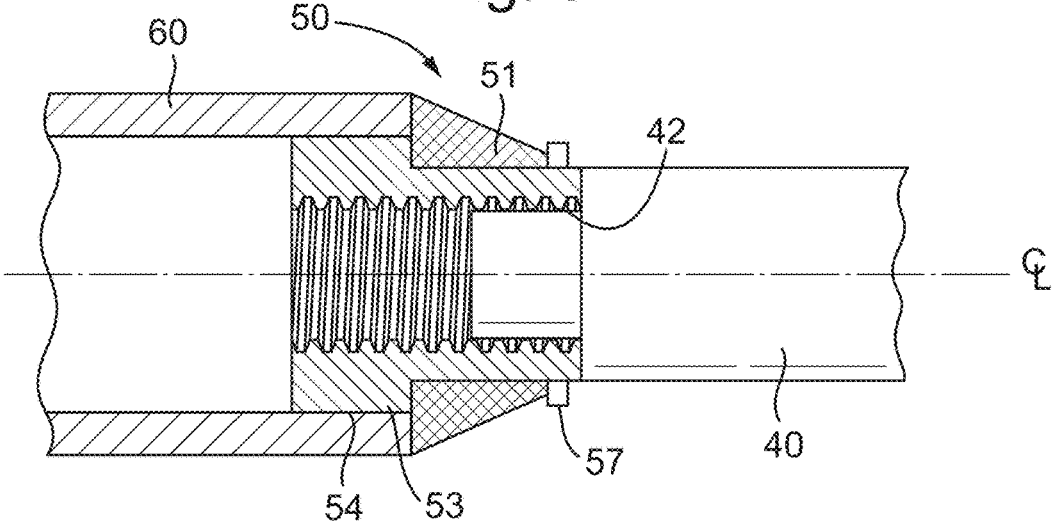
FIG. 5 is the longitudinal cross section of FIG. 4, with a mandrel.

FIG. 5 shows the same workpiece as FIG. 4, but this time with one portion of a mandrel 40 connected to the nut 50. The mandrel 40 has a step 42 in its diameter, such that the section with a smaller diameter fits within the nut 50, whereas the section with a larger diameter does not and instead provides a continuation surface corresponding in diameter to the end of the tapered outer surface 58 of the internal support member 51 with the smaller diameter.

Figure 6:
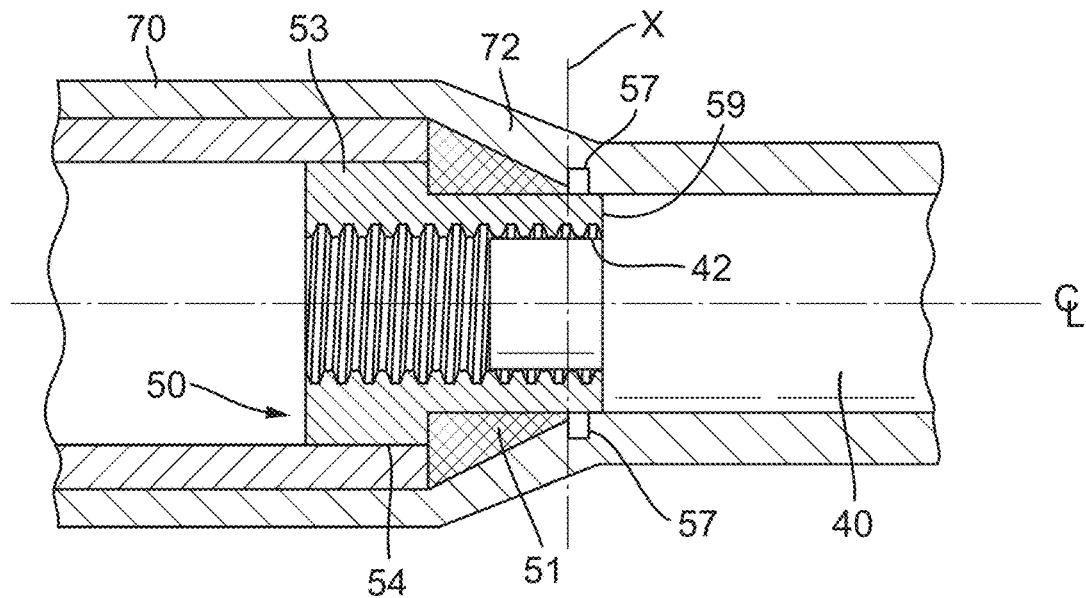
FIG. 6 is the longitudinal cross section of FIG. 5, with a filament wound structure on top.

FIG. 6 depicts an identical configuration to claim 5 in the next stage of the construction, where a filament composite layer has been deposited onto the workpiece and mandrel 40 and cured to form the composite member 70. As shown in FIG. 6, the screw thread 52 (see FIG. 4) of the internal nut 53 of the embedded nut 50 is located within the inwardly tapered section 72 of the composite member 70. The nut 50 also has an annular end surface 59 axially aligned with, and radially inward of, the narrowest (smallest outer and inner diameter) part 74 of the inwardly tapered section 72.

The inwardly tapered section 72 of the composite member 70 follows and is supported by the tapered radially outer surface, i.e. tapered surface 58 of the internal support member 51 of the embedded nut 50.

Figure 3:
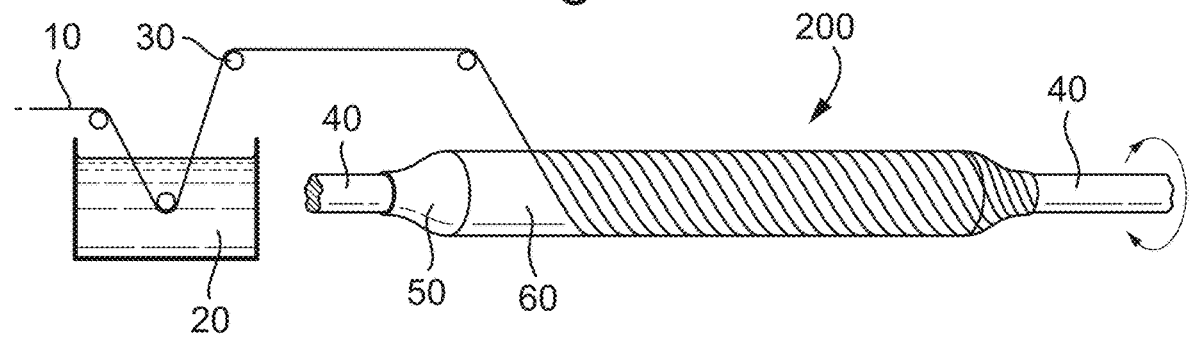
FIG. 3 shows schematically a filament winding process for forming a composite tubular structure.

FIG. 3 schematically shows an example of a wet filament winding process for forming a composite tubular structure 200. Filaments 10, for example, in the form of a tow or part-tow, are passed over rollers 30 through a solution of resin 20 which will form the matrix. Further rollers 30 direct the filaments 10 for winding onto the workpiece. The workpiece comprises a mandrel 40 to which is mounted a liner 60 having an embedded nut 50 at one or both ends of the liner 60. The resin-soaked filaments 10 are then wound onto the mandrel 40, nuts 50 and liner 60 which are rotated by the mandrel 40. In FIG. 3, the direction of rotation of the mandrel is shown schematically by the arrow. In practice, multiple layers of filament windings will be built up to form the composite member, the layers varying in winding angle and/or direction and/or filament specifications to tailor the properties of the composite member for its intended purpose and expected loadings.

In some embodiments (not shown), the filament winding process is a dry process and the resin is added later, with curing taking place under pressure and in a vacuum (Resin Transfer Moulding—RTM).

During the fabrication process, a mandrel tool may be used to cover a circlip 57 or other detachable fastener holding the internal support member 51 and the internal nut 53 of the multipart nut together (see below). Alternatively the assembly may be held in tension during winding, thereby securing the internal nut 53 against the internal support member 51.

By depositing filaments or tows around both of the liner 60 and the nut(s) 50, for example, during a winding operation, the nuts 50 (and their screw thread) become embedded, or enclosed, within the composite member 70. The nuts 50 have a tapered outer surface 58 which provides the base structure for an inwardly tapered section 72 at each end of the composite member 70 of the composite tubular structure 200, the inwardly tapered sections 72 narrowing towards an end of composite member 70 to provide a constriction to retain the nut 50 (and the screw thread) within.

This use of a liner 60 avoids the problem of how to insert a nut 50 into an elongate composite member 70 where the nut 50 has a maximum outer radius which is larger than the inner radius of an opening at one end of the composite member 70.

The use of the mandrel 40 allows the liner 60 to be spun while the filaments or tows are being applied to the liner 60. A seal may be provided between the nuts 50 at the ends of the liner 60 and the respective section of mandrel 40 to prevent ingress of resin into the composite member during processing. In this way, screw threads 52, 82 or other formations provided in the nuts 50 for connection to an end fitting or attachment such as a rod 80 of a connector can be maintained free of resin. The liner 60 may be of an impervious material and together with the nuts 50, define an enclosed space which can be pressurised during the filament or tow deposition and/or curing process to maintain production dimensions.

The mandrel 40 is freed by cutting through a cross section of the composite tubular structure 200, along line X shown in FIG. 6, which is a cross-section adjacent to the circlip 57, on an axially inward side of the circlip 57, i.e. away from the axial end of the composite tubular structure 200. The cut is made through the composite member 70 close to its narrowest part 74 and, depending on the various dimensions, possibly also through an end of the internal nut 53. The annular, cut surface 76 provides the new end of the composite member 70. The inwardly tapered section 72 can be machined or otherwise finished, to achieve the desired surface properties, before a connector 80, 84, 86 is assembled at the end.

The end of the finished composite member 70 may correspond to, i.e. may be aligned with, or lie flush with, an end surface of the embedded nut 50. In other words, the end of the composite member may comprise an annular surface extending in a radial direction between the inner and outer surfaces of the inwardly tapered section 72. The method may further comprise machining the outer surface of the tubular structure to prescribed dimensions.

The composite tubular structure may be provided with a connector or end fitting or attachment just at one end, or more usually at both ends.

FIG. 7 shows one end of the finished composite tubular structure 200, where an end fitting or attachment such as a rod 80 with a male screw thread surface 82 has been screwed into the thread 52 of the internal nut 53 of the embedded nut 50. Threaded onto the end fitting or attachment 80 is an external nut 84, followed by an annular wedge 86. The internal sloped surface 88 of the annular wedge 86 matches and mates with the outer surface 77 of the inwardly tapered section 72. The end fitting or attachment 80 is gradually screwed into the screw thread surface 52 of the embedded nut 50. By tightening the end fitting or attachment 80 into the internal nut 53, the internal sloped surface 88 of the annular wedge 86 is clamped tightly against the outer surface 77 of the inwardly tapered section 72 of the composite member 70, thereby creating a tight connection for transmitting the axial loads and possibly torque.

The through-thickness compression can be pre-loaded by adjusting the tightness of the external nut 84, and/or by tightening the connection between the end fitting or attachment 80 and the multipart embedded nut 50. Alternatively a PCD (Pitch Circle of Diameter) of bolts 87 (shown in FIGS. 9*a*-*b* and illustrated in FIGS. 1 to 3 of WO 2009/06670, which is incorporated by reference) may be used to drive the annular wedge 86 into the outer surface 77 of the inwardly tapered section 72. A gap 90 may be left between the axial end of the tubular structure 200 and the external nut 84 in order to prevent weakening of the composite tubular structure 200 through contact.

FIG. 8 shows a similar configuration to that of FIG. 7, except that the liner 60 varies in diameter along the axial direction, so that the composite member 70 which is formed around the liner 60 also varies in diameter along the axial direction. Further, the wall thickness of the composite member 70 varies, so that where the composite member 70 has a larger diameter, the wall of the composite member 70 is thinner compared to the wall thickness of the composite member 70 where the composite member 70 has a smaller diameter. Additionally, at the inwardly tapered section 72 at the end of the composite member 70, the wall thickness can be seen to increase towards the axial end of the composite member 70. Alternatively the wall thickness at the inwardly tapered section may be uniform or may even reduce in thickness towards the end.

Figure 9A:
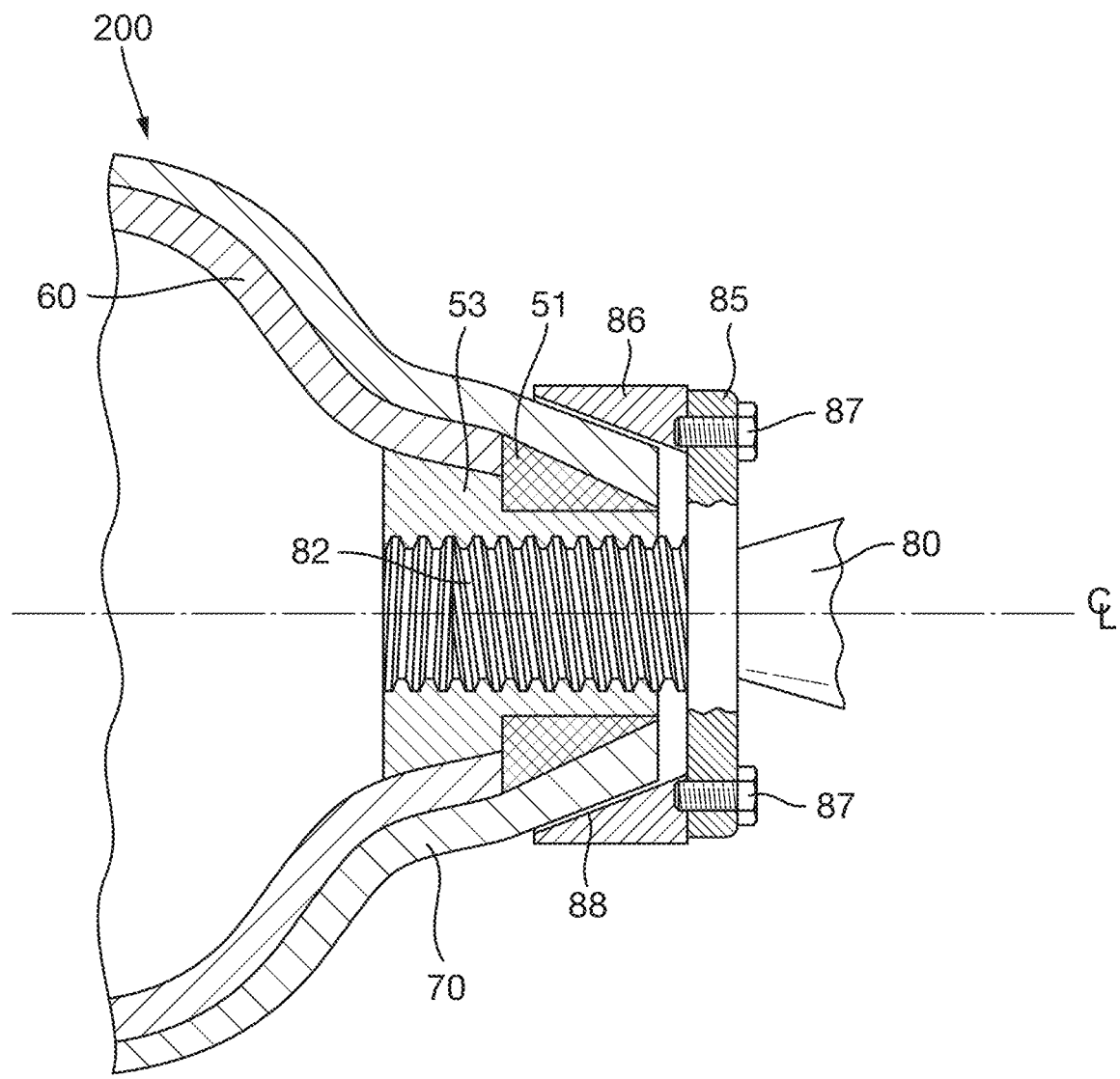
FIG. 9a shows a longitudinal cross-section of a composite tubular structure comprising a liner, illustrating an example of a formation that may be provided at an end of a retained liner, the structure having a taper of constant wall thickness.

FIGS. 9*a* and 9*b* show a similar configuration to that of FIG. 8, with the exception that there is a flange 85 permanently fixed to the end fitting or attachment 80 instead of the external nut 84. A PCD (Pitch Circle of Diameter) of bolts 87 passes through the flange 85 into contact with the wedge 86. The screw thread 82 of the end fitting or attachment 80 can be tightened into the screw thread 52 of the embedded nut 50 to bring the flange 85 closer or the plurality of bolts 87 can be tightened in turn to set the preload in the connection 80, 85, 86, 87.

As can be seen in FIG. 8, the wall thickness of the inwardly tapered section 72 of the composite member 70 may increase towards the end of the composite member 70, i.e., the angle of taper (relative to the central axis or centreline CL) of the inner surface 78 of the inwardly tapered section 72 is greater than the angle of taper of the outer surface 77 of the inwardly tapered section 72. However, this need not be the case. FIG. 9*a* shows the composite member 70 having a constant (i.e. uniform) wall thickness at the inwardly tapered section 72, while FIG. 9b shows the wall thickness of the inwardly tapered section 72 reducing towards the end of the composite member 70.

Since the composite tubular member 70 is clamped between the annular wedge 86 and the internal support member 51 of the embedded multipart nut 50, the connection is particularly suitable for transmitting axial compressive and tensile loads.

Figure 10:
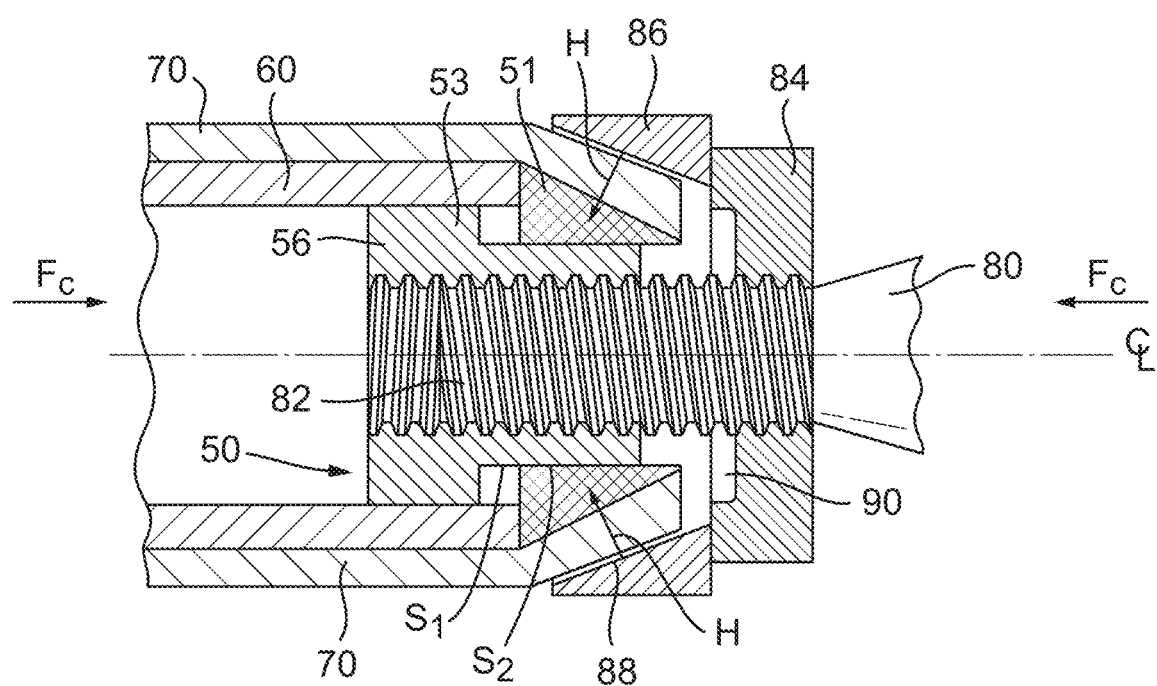
FIG. 10 shows the longitudinal cross section of FIG. 7, where the composite tubular structure is subject to compression.

FIG. 10 shows the arrangement of FIG. 7 undergoing compressive loading $F_C$ outside the limits of normal operating tensile loads. The compressive loads are transferred to the annular wedge 86 through the interaction of the external nut 84 on the end fitting or attachment 80 of the connector urging against the annular wedge 86. This causes hoop stresses H to develop under the annular wedge 86 where it engages the outer surface 77 of the inwardly tapered section 72 of the composite member 70. At the same time, once a predetermined working load has been exceeded, the internal nut 53, which is also receiving compressive loads from the end fitting or attachment 80, is caused to slide with respect to the internal support member 51 in a direction away from the end of, and into the body of, the composite member 70, and thus away from the internal support member 51. This is facilitated by the first and second sliding surfaces $s_1$, $s_2$. Through that displacement of the internal nut 53 (greatly exaggerated in FIG. 10), the internal support member 51 can remain in place against the inner surface 78 of the inwardly tapered section 72. The hoop stresses H are then able to be countered by the resistance (ring or hoop strength) of the internal support member 51, maintaining the conical shape of the inwardly tapered section 72 to prevent or resist failure.

This arrangement also helps to reduce fretting of the inwardly tapered section 72 through maintaining contact between the inwardly tapered section 72 of the composite member 70 and the corresponding regions of the annular wedge 86 and the internal support member 51 of the embedded multipart nut 50. This results in longer product life.

Figure 11A:
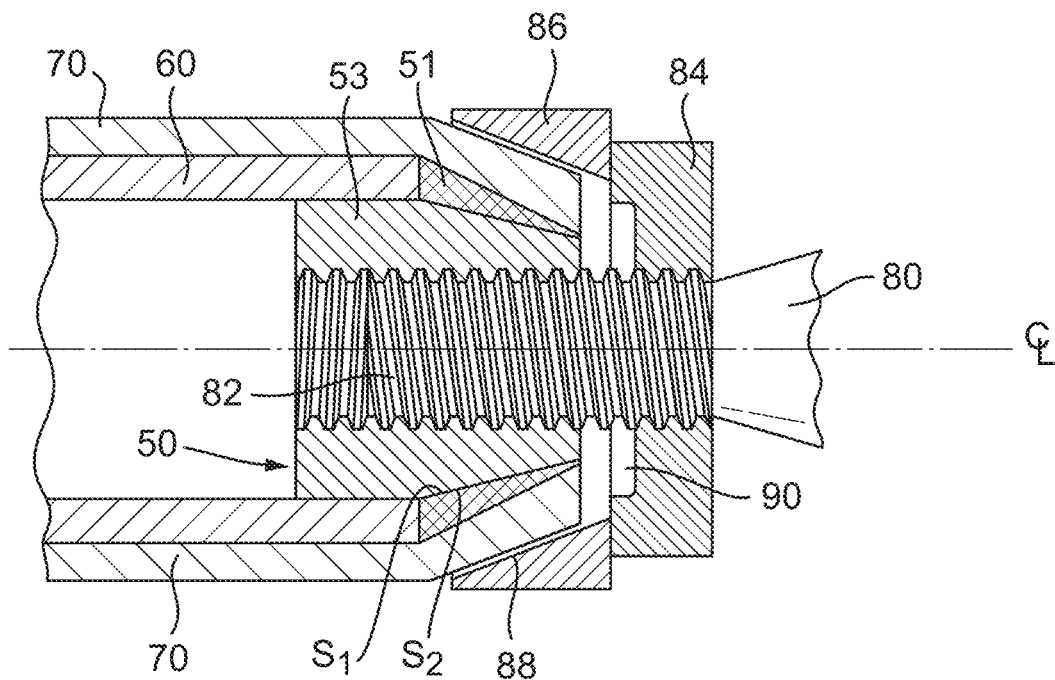
FIGS. 11a-d show an arrangement in which the multipart nut has sliding surfaces which are angled to a centreline, where in FIGS. 11b and 11d, the liner has been removed.
Figure 11B:
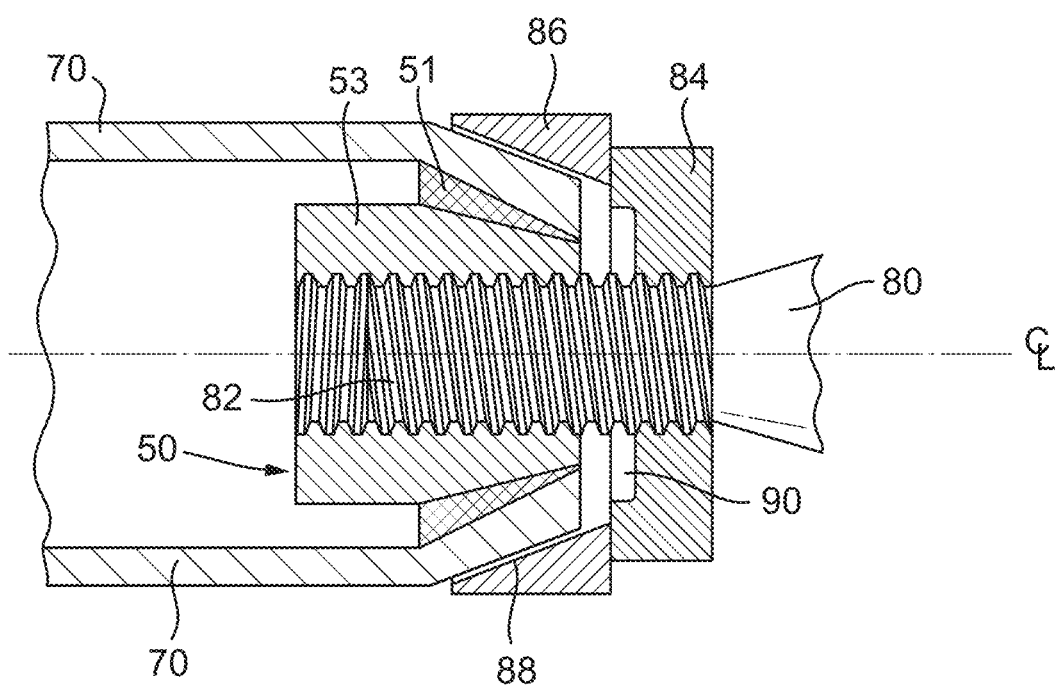
Figure 11C:
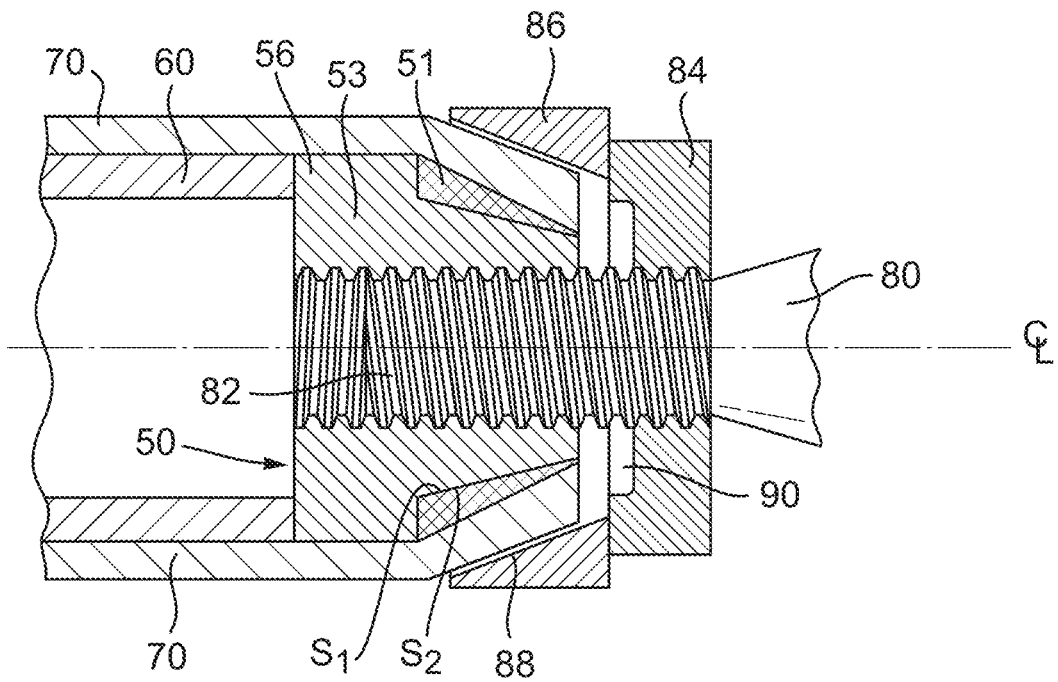
Figure 11D:
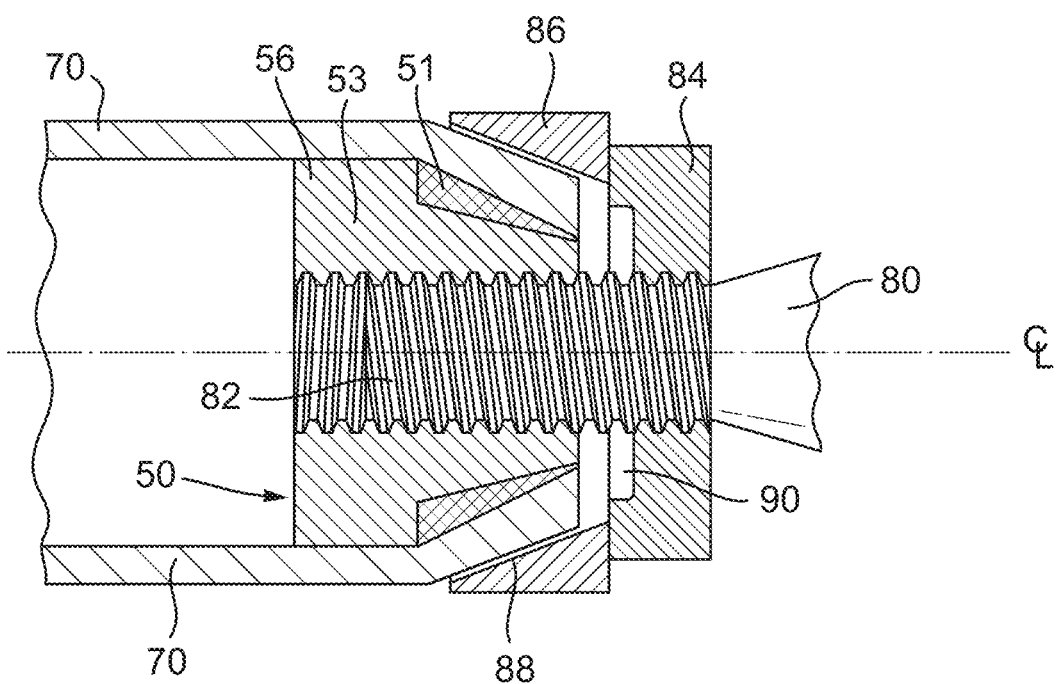

FIGS. 11a-d show an alternative arrangement where the sliding surfaces of the internal nut 53 and the internal support member 51 are at an angle to the centreline CL. FIGS. 11b and 11d show the arrangement of FIGS. 11a and 11c respectively, where the liner has been removed.

In the arrangement of FIGS. 11c and 11d, there is a radially protruding stop 56 at one end of the internal nut 53, configured to limit the sliding of the internal support member 51 on the internal nut 53 in one direction.

However the provision of a radially protruding stop 56 is not strictly necessary, since the internal support member 51 is limited in its ability to slide over the internal nut 53 in that direction, namely in a direction away from the end of, and towards the main body portion 2 of, the composite tubular member 70. The reason for this is the increasing diameter of the radially outer first sliding surface $s_1$ of the internal nut 53 which increases in a direction towards the main body portion 2 of the elongate composite member 70.

In any event, if a liner 60 is still present within the composite tubular structure as shown in FIG. 11a, this still may function to provide some small amount of limitation on the sliding distance of the internal support member 51.

Figure 1:
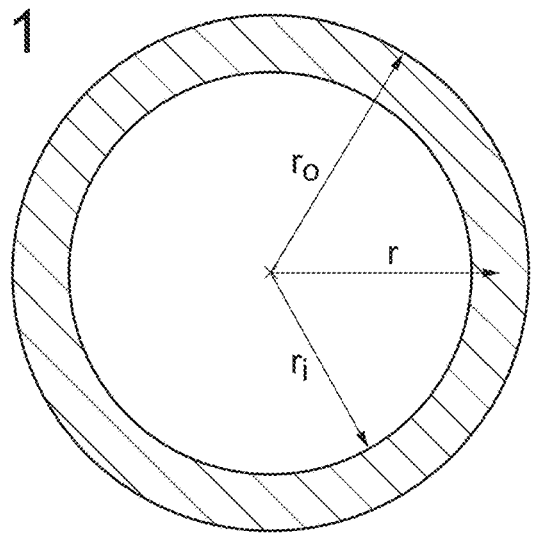
FIG. 1 schematically depicts a cross section of a tubular structure showing inner, outer and positional radii.
Figure 2B:
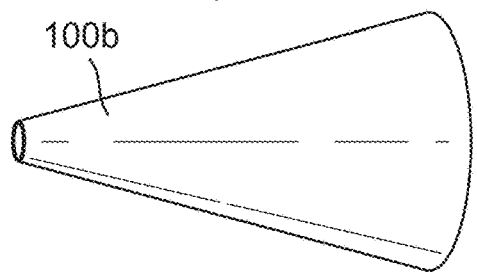
FIG. 2b shows schematically a composite tubular structure having a conical main body portion with an increasing radius in the axial direction from one end to the other.
Figure 2C:
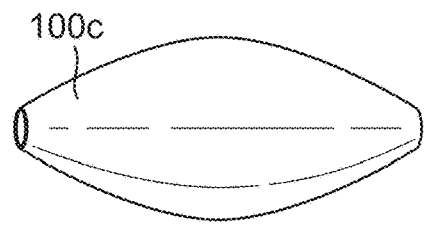
FIG. 2c shows schematically a composite tubular structure having a convex main body portion ("lemon-shaped" main body portion) with an increasing radius in the axial direction from each tapered end.

The composite member may have rotational symmetry about a longitudinal central axis or centreline CL, to define an internal radius ($r_i$), an outer radius ($r_o$) and a wall thickness ($w = r_o - r_i$) of the composite member along its three various sections: the two inwardly tapered sections and the main body portion inbetween, as shown in FIG. 1.

The main body portion 2 may be of constant internal radius $r_i$. By comparison, the inwardly tapered sections 72 have a progressively changing internal radius that is less than or equal to the internal radius of the main body portion. Alternatively the main body portion 2 may vary in internal radius $r_i$ in the longitudinal centreline CL direction. For example, the internal radius $r_i$ of the main body portion 2 may increase in the longitudinal direction from one end to the other (exaggerated in FIG. 2b). In another example, the internal radius of the main body portion may increase in the longitudinal direction from each end of the composite member towards its middle forming a "lemon-shape" (exaggerated in FIG. 2c) or similar convex shape where greater resistance to buckling can be provided by the wider midstructure. By varying the radius, the tubular structure can be adapted for improved support against buckling under heavy loads or in bending.

The composite tubular structure may have a wall thickness which varies in the longitudinal direction. A thinner wall may be used where the radius of the tubular structure is larger, compared to a thicker wall where the radius of the tubular structure is smaller.

The composite tubular structure may be used as a piston rod in a hydraulic actuator. The composite tubular structure may be used as a tie rod or in any other application where a rod undergoes significant tension and/or compression.

When the composite tubular structure 200 is a piston rod, the annular wedge 86 may be a piston head. The connection may therefore form part of a hydraulic actuator comprising a composite piston rod. The composite piston rod may comprise a connection portion towards one end for permitting mechanical connection of the composite piston rod to a piston head. The maximum outer diameter of the composite member 70 and any connection portion of the composite piston rod is equal to, or less than, the diameter of a gland seal which seals around the piston rod during operation of the hydraulic actuator.

The tensioner may be any means that can act to pull the embedded nut 50 within the inwardly tapered section 72 towards the end of the composite member 70, and push the annular wedge 86 onto the inwardly tapered section 72 so as to clamp the inwardly tapered section 72 therebetween. The tensioner 84, 85, 87 may provide a preload on the connection by pulling on the embedded nut 50 whilst pushing on the annular wedge 86.

The clamping load (preload) may be of greater magnitude than the axial tensile or compressive loads that the system is under and therefore there may be no relative movement between the surfaces of the composite and the embedded nut 50 or annular wedge 86 during use which could cause fretting fatigue failure.

The tensioner may comprise a nut 84 or may comprise one or more secondary bolts (or screws) 87 as shown in FIG. 9, which can exert a force against the annular wedge 86. The secondary bolts may be referred to as compression grab bolts and may extend through an annular flange 85 of a bolt head provided on the end fitting or attachment 80 that engages a thread of the embedded nut. By having a plurality of load means spaced circumferentially around an axial end face of the annular wedge 86, the clamping force (preload) applied between the annular wedge 86 and the embedded nut 50 can be applied evenly and gradually over the circumference.

The tensioner may be designed so that it only exerts a through-force, i.e., a clamping force, on the inwardly tapered section 72 that is clamped between the annular wedge 86 and the embedded nut 50; it may be designed to leave a recess 90 so that it does not put any direct force on an axial end of the composite member 70.

The inwardly tapered sections 72 may each have a taper angle of between 5 to 25° relative to a central axis, i.e. centreline CL of the composite tubular structure, i.e., it is a relatively shallow angle of taper. The range of taper angle may be greater than or equal to 8° and/or less than or equal to 15° relative to a central axis of the composite tubular structure. This allows a good transmission of, in particular, axial forces through the connection.

A higher taper angle may be beneficial to reduce length of the connection. However, the higher the taper angle the more difficult it is to manufacture the composite tubular structure. Therefore the taper angle is a trade-off between these two factors. It has been found that a range of 8 to 15 degrees provides a good load transfer whilst being relatively straightforward to manufacture.

It has been found that an arrangement with a composite tubular structure of 1 inch (about 2.5 cm) diameter and an inner and outer diameter taper angle of about 10 degrees it is possible to transmit over 130 kN of load.

An inner taper angle and an outer taper angle of the inwardly tapered section 72 of the composite member 70 may be different.

During use, inside the connector assembly, axial loads result in hoop and through-thickness stresses. By having a composite member with different taper angles on the inner diameter and the outer diameter of the inwardly tapered section the ratio of hoop:through-thickness stresses can be tailored to give a joint of maximum strength.

As mentioned above, the composite member 70 of the tubular structure 200 may be formed around a liner 60. The liner 60 may comprise a range of possible materials that provide a substrate for the filaments to be wound around. The liner 60 may be a different material to that of the composite member 70. The liner 60 may be a lightweight material, e.g., less dense than the material of the composite member it is used to support. The liner material may be deformable, for example, through the application of pressure and heat, so that it can be moulded to different profiles. In one example the liner 60 is a polymer material, such as polypropylene or polyethylene.

The shape of the liner 60 may be chosen to optimise the shape and thus the load bearing capability of the composite member 70 because the inner surface of the composite member 70 takes the shape of the outer surface of the liner 60. Thus the liner 60 may be pre-formed with an outer radius that varies with longitudinal distance along a liner axis. The liner 60 may be pre-formed, e.g., blown out and/or moulded, assembled, etc., with a middle region having a larger outer radius compared to the liner ends. In another example, the liner 60 may have a larger outer radius at one end compared to the other. This may be in addition to a middle region of the liner 60 having been expanded or simply being larger than the other end of the liner. In another example, the liner 60 may be formed so as to have a longitudinally asymmetric, but axisymmetric, profile along its length.

The liner 60 may assist with holding the nuts 50 in place during the winding and curing process. To this end, the embedded nuts 50 may each comprise a step 54 in their outer surface for attachment to the liner 60, the liner 60 having an outer radius which follows that of the nut 50 to define an internal radius of the composite member 70 in the longitudinal direction. In the multipart nut 50, the step 54 may comprise a step between a radially outermost surface of the internal nut 53 and a radially outermost surface of the internal support member 51.

Together with the nuts 50, the liner 60 may maintain a sealed environment within the composite member 70 of the tubular structure 200 during the processing. An internal pressure can be maintained (or raised during the processing) within the liner, e.g., to provide resistance to the winding forces to maintain dimensions and/or to maintain dimensions during the curing process.

The liner 60 may be subsequently removed by melting, dissolving, burning or another material removal process. The material of the liner 60 can be drained or otherwise extracted through one of the nuts 50 in the inwardly tapered section 72 of the composite tubular member 70. It may be fully-removed or partially removed.

The liner 60 could also be peeled out from within the composite member 70 of the composite tubular structure 200, it could be unravelled or it could be broken up in some other way in order to allow the liner 60 to be removed. For example, the liner 60 may be removed by degradation using UV light or other trigger source.

Alternatively, the liner 60 may be retained, and may remain intact within the composite member 70 of the composite tubular structure 200. During attachment of the connectors 80, 84, 86, the liner 60 may lock the embedded nuts 50 in place at each inwardly tapered section 72 of the composite member 70 of the composite tubular structure 200, preventing the nuts 50 from becoming detached from the inwardly tapered sections 72 (i.e. moving away from the associated end of the composite member 70). The liner 60 may provide a mechanical engagement with the embedded nut 50, preventing slippage and rotation of the nut 50 while a connector is secured in place (i.e. when a tensioner is connected to the nut). This might be achieved, for example, by providing the liner 60 with formations around its circumference where it abuts against the nut 50. The nut 50, having opposite formations (i.e. configured to interlock with the liner formations), could then be locked firmly in place by the liner so that during the process of attaching a connector 80, 84, 86, the nut 50 does not have to rely merely on the bond strength between the cured composite to resist the rotational forces from screwing in the parts of a connector; it can also be locked to some extent by the liner. By way of example, one or more teeth could be provided on the liner 60 or nut 50, for engagement with hollows disposed in the nut 50 or liner 60 respectively.

In a similar way, the internal support member 51 and the internal nut 53 may include some type of formation, for example, a spline or projection engaging with a groove or recess, to prevent the internal nut 53 rotating with respect to the inwardly tapered section 72 when a connector 80, 84, 86 is being fitted or replaced.

When a liner 60 is not used, a separate process control stage may be desired in the production process to keep the nuts 50 securely bonded to the composite member before a connector 80, 84, 86 is attached (since if a nut were to come loose, it may become lost within the body of the composite tubular structure). The nuts 50 may have to undergo a surface preparation stage, for example, where they undergo shot peening to add surface texture/roughness, cleaned and/or primed before they are embedded in the composite member 70, in order to ensure adequate bonding with the composite tubular structure. With the addition of a liner 60, such a process control stage may be avoidable through the nuts 50 remaining in place by interlocking with the liner 60 during the process of attaching the connector 80, 84, 86.

As another example, the liner 60 may be impervious to fluid, so could contain fluid, and/or act as a conduit for fluids. Thus the liner 60 may contain a pressurised fluid allowing the tubular structure, for example, to resist certain buckling forces and impact damage during use or fabrication of a structure, in conjunction with which it is to be used. The tubular structure 200 could provide a reservoir or a conduit for fluids, for example, hydraulic fluids or coolants. The retention of a fluid in the form of a gas may be useful for increasing buoyancy. An impervious liner 60 could also be pressurised during winding and/or curing of the composite member 70 of the composite tubular structure 200 to ensure the final shape of the composite tubular structure 200. This may also allow a thinner, less-stiff liner 60 to be used, which would also be lighter in the final product where it is retained.

As a further example, the liner 60 may be made of metal or other conductive material and so may provide a conductive path for electricity. This may, for example, be used to ground components, to convey electrical signals and/or to provide lightning strike protection.

The liner 60 may also provide other advantageous structural and/or material properties that are supplementary to the inherent properties of the composite member.

The composite tubular structure 200 may have fibre alignment which is uni-directional or multiaxial and may be manufactured by composite stitching, lay-up, filament winding or any other process known for producing tubular composite elements. The composite structure may also be produced from any known fibre and matrix combination. For example, the composite tubular structure may have carbon or glass for the fibre, and may have thermoset or thermoplastic polymers for the matrix. The material of the connector may be determined by the nature and magnitude of the desired load case and environmental conditions.

The internal support member 51 is generally in the form of a ring having a tapered outer surface 58. Conceivably, it could comprise multiple parts, for example two semi-circular or semi-annular sections, or more sections which fit together to form an annular frustoconical shape.

Moreover, the multipart nut 50 could be made of more than two parts. For example, a ring, sleeve or collar could be positioned between the internal support member 51 and the internal nut 53. The sliding surfaces $s_1$, $s_2$ of the internal nut 53 and the internal support member 51 respectively might slide against an intermediate sliding surface to achieve the effect of the internal nut 53 being able to slide within, or longitudinally relative to, the internal support member 51.

The invention claimed is:

1. A composite tubular structure comprising:
an elongate composite member having an inwardly tapered section at an end; and
an embedded nut retained in the end inwardly tapered section for forming a connection with another component,
wherein the inwardly tapered section has an inner surface which follows a tapered outer surface of the embedded nut, the inwardly tapered section narrowing the composite member in a longitudinal direction towards the end so as to provide a constriction which retains the embedded nut within the inwardly tapered section;
wherein the embedded nut comprises a multipart nut, comprising an internal nut and an internal support member, and wherein the internal nut is arranged to slide within the internal support member in a direction away from the end of, and into, the elongate composite member when the composite tubular structure is under conditions of excessive axial compressive load.

2. A tubular structure as claimed in claim 1, wherein:
the internal nut has a radially inner engagement surface for engaging with an end fitting or attachment and a radially outer first sliding surface; and
the internal support member has a radially outer surface providing the tapered outer surface of the embedded nut, and a radially inner second sliding surface for contacting and sliding on the first sliding surface of the internal nut.

3. A tubular structure as claimed in claim 2, wherein at least a portion of the first sliding surface of the internal nut and a portion of the second sliding surface of the internal support member are parallel to a central axis of the internal nut.

4. A tubular structure as claimed in claim 2, wherein at least a portion of the first sliding surface of the internal nut and a portion of the second sliding surface of the internal support member are at an inclined angle to a central axis of the internal nut, sloping radially towards the central axis in a direction towards the end of the elongate composite member, the angle being greater than 0°; and
optionally wherein the angle is less than the angle of the tapered outer surface of the multipart nut.

5. A tubular structure as claimed in claim 1, wherein the composite tubular structure includes a connector to provide a connection with another component, the connector comprising: an end fitting or attachment for engaging the internal nut of the multipart nut, the engagement occurring within the inwardly tapered section; an annular wedge configured to urge against an outer surface of the inwardly tapered section; and a tensioner provided to exert a clamping force on the inwardly tapered section via the annular wedge.

6. A tubular structure as claimed in claim 5, wherein the internal support member is arranged to remain in place against the inner surface of the inwardly tapered section under the conditions of excessive axial compressive load to counter hoop stresses exerted by the annular wedge on the outer surface of the inwardly tapered section.

7. A tubular structure as claimed in claim 1, wherein the internal nut comprises a radially protruding portion at one end which is configured to limit the sliding of the internal nut within the internal support member in a direction towards the end of the elongate composite member, to help transmission of axial loads under conditions of tensile loading.

8. A tubular structure as claimed in claim 1, wherein the inwardly tapered sections each have a taper angle of between 5 to 25° to a central axis of the structure, optionally between 8 to 15°.

9. A tubular structure as claimed in claim 1, further comprising a liner within the composite member, and wherein the embedded nut comprises a step in its outer surface for attachment of the liner, the step being provided by a radial difference between a radially outermost surface of the internal nut and a radially outermost surface of the internal support member, the liner resting in the step to define an outer radius which follows that of the nut to define an internal radius of the composite member in the longitudinal direction.

10. A tubular structure as claimed in claim 1, wherein the tubular structure comprises an inwardly tapered section at both ends, each retaining an embedded multipart nut.

11. A method of manufacturing the tubular structure of claim 1, comprising:
attaching a nut to an end of a liner to provide a surface for depositing filaments over, the nut having a tapered outer surface and being arranged so that the outer surface tapers in a direction away from the liner;

wherein the nut comprises a multipart nut, comprising an internal nut and an internal support member, in which the internal nut is able to slide within the internal support member in a direction away from its associated end of, and into, the elongate composite member; and depositing filaments around the liner and the attached nut to form a composite member having a main body portion and an inwardly tapered section at the end with the embedded nut, the inwardly tapered section having an inner surface which follows the tapered outer surface of the embedded nut.

12. A method as claimed in claim 11, wherein for the multipart nut: the internal nut has a radially inner engagement surface for engaging with an end fitting or attachment and a radially outer first sliding surface; and the internal support member has a radially outer surface comprising the tapered outer surface of the embedded nut, and a radially inner second sliding surface for contacting and sliding on the radially outer first sliding surface of the internal nut, wherein the method includes attaching the internal support member to the internal nut using a fastener at an end of the internal support member and internal nut distal from the liner;

and optionally wherein the method further comprises a step of attaching a multipart nut to the other end of the liner.

13. A method as claimed in claim 11, wherein the liner is supported between two parts of a mandrel while the filament deposition is taking place;

optionally wherein each part of the mandrel further comprises:

an inward radial step, such that a portion of the mandrel has a larger diameter and a portion of the mandrel has a smaller diameter; and wherein once the winding has been completed and the mandrel is to be removed, a cut is made in a radially inward direction through the composite member and optionally the multipart nut at a position adjacent to the fastener, and the mandrel, any excess filament windings, the fastener and, optionally, any excised portions of the embedded nut are removed.

14. A method as claimed in claim 11, wherein the method comprises pressurising the liner during a winding and/or forming and/or curing operation, and/or in subsequent service of the tubular structure, and/or optionally wherein: the liner is subsequently retained within the tubular structure; or wherein the liner is removed from within the tubular structure by melting, dissolving, burning, peeling, unravelling, fragmentation, UV degradation or another removal process.

15. A method of improving the compressive strength of a connection to a tubular structure that includes:

an elongate composite member having an inwardly tapered section at an end; and an embedded nut retained in the end inwardly tapered section for forming a connection with another component;

wherein the inwardly tapered section has an inner surface which follows a tapered outer surface of the embedded nut, the inwardly tapered section narrowing the composite member in a longitudinal direction towards the end so as to provide a constriction which retains the embedded nut within the inwardly tapered section;

wherein the embedded nut comprises a multipart nut, comprising an internal nut and an internal support member, and wherein the internal nut is arranged to slide within the internal support member in a direction away from the end of, and into, the elongate composite member when the composite tubular structure is under conditions of excessive axial compressive load;

wherein the composite tubular structure includes a connector to provide a connection with another component, the connector comprising: an end fitting or attachment for engaging the internal nut of the multipart nut, the engagement occurring within the inwardly tapered section; an annular wedge configured to urge against an outer surface of the inwardly tapered section; and a tensioner provided to exert a clamping force on the inwardly tapered section via the annular wedge.

the method comprising:

using the embedded nut comprising an internal nut and an internal support member, the internal support member remaining in place against an inner surface of the inwardly tapered section to counter compressive hoop stresses applied through the annular wedge to the outer surface of the inwardly tapered section of the elongate composite member while permitting sliding of the internal nut within the internal support member in a direction away from the end of, and into, the elongate composite member under conditions of excessive compressive axial load.

* * * * *